(12) United States Patent
Khatri et al.

(10) Patent No.: US 12,284,167 B2
(45) Date of Patent: Apr. 22, 2025

(54) METHOD AND SYSTEM FOR A CONDITIONAL KEY STORAGE USING NETWORK INFORMATION OF A KEY MANAGEMENT SERVICE

(71) Applicant: Dell Products L.P., Round Rock, TX (US)

(72) Inventors: Mukund Khatri, Austin, TX (US); Sanjeev S. Dambal, Austin, TX (US); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 437 days.

(21) Appl. No.: 17/580,910

(22) Filed: Jan. 21, 2022

(65) Prior Publication Data

US 2023/0239280 A1   Jul. 27, 2023

(51) Int. Cl.
*H04L 9/40* (2022.01)
(52) U.S. Cl.
CPC .......... *H04L 63/061* (2013.01); *H04L 63/162* (2013.01); *H04L 63/20* (2013.01)
(58) Field of Classification Search
CPC ..... H04L 63/061; H04L 63/162; H04L 63/20; H04L 9/0891
See application file for complete search history.

(56) References Cited

U.S. PATENT DOCUMENTS

| | | | |
|---|---|---|---|
| 8,522,083 B1 | 8/2013 | Cohen et al. | |
| 10,127,389 B1 | 11/2018 | Roth | |
| 2010/0266132 A1 | 10/2010 | Bablani et al. | |
| 2012/0054728 A1 | 3/2012 | Rohde et al. | |
| 2015/0347264 A1 | 12/2015 | Mohammed et al. | |
| 2017/0255460 A1 | 9/2017 | Frank et al. | |
| 2018/0060596 A1 | 3/2018 | Hamel | |
| 2018/0123791 A1 | 5/2018 | Ness | |
| 2018/0329733 A1* | 11/2018 | Aronov | G06F 9/4843 |
| 2019/0081982 A1* | 3/2019 | Breton | H04L 63/145 |

FOREIGN PATENT DOCUMENTS

| | | | | |
|---|---|---|---|---|
| WO | WO-2018125989 A2 * | 7/2018 | ......... | G06F 16/1824 |
| WO | WO-2021196913 A1 * | 10/2021 | ............ | H04W 12/02 |

* cited by examiner

*Primary Examiner* — Alexander Lagor
*Assistant Examiner* — Shu Chun Gao
(74) *Attorney, Agent, or Firm* — Chamberlain, Hrdlicka, White, Williams & Aughtry; Aly Z. Dossa

(57) ABSTRACT

A method for managing a storage system includes initiating, by a hardware resource manager, a boot-up of a storage controller managing the storage system comprising a plurality of storage devices, making a determination, by the storage controller, that the storage controller is in a secured mode, based on the determination: identifying a security state of each of the plurality of storage devices, determining that a storage device of the plurality of storage devices is in an unsecured state, and based on the unsecured state, sending, by the storage controller, a security operation request for securing the storage device, obtaining a secure state response from the hardware resource manager corresponding to securing the storage device, and based on the secure state response, resuming operation of the storage controller based on the secure mode.

12 Claims, 7 Drawing Sheets

METHOD AND SYSTEM FOR A CONDITIONAL KEY STORAGE USING NETWORK INFORMATION OF A KEY MANAGEMENT SERVICE

BACKGROUND

Protecting the sensitive information stored on storage devices is one of the most important things that organizations are focusing on these days. As data stored on drives may contain critical information, it is important that they should be insured in such a way that an adversary cannot steal the data even if they get access to the drives.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
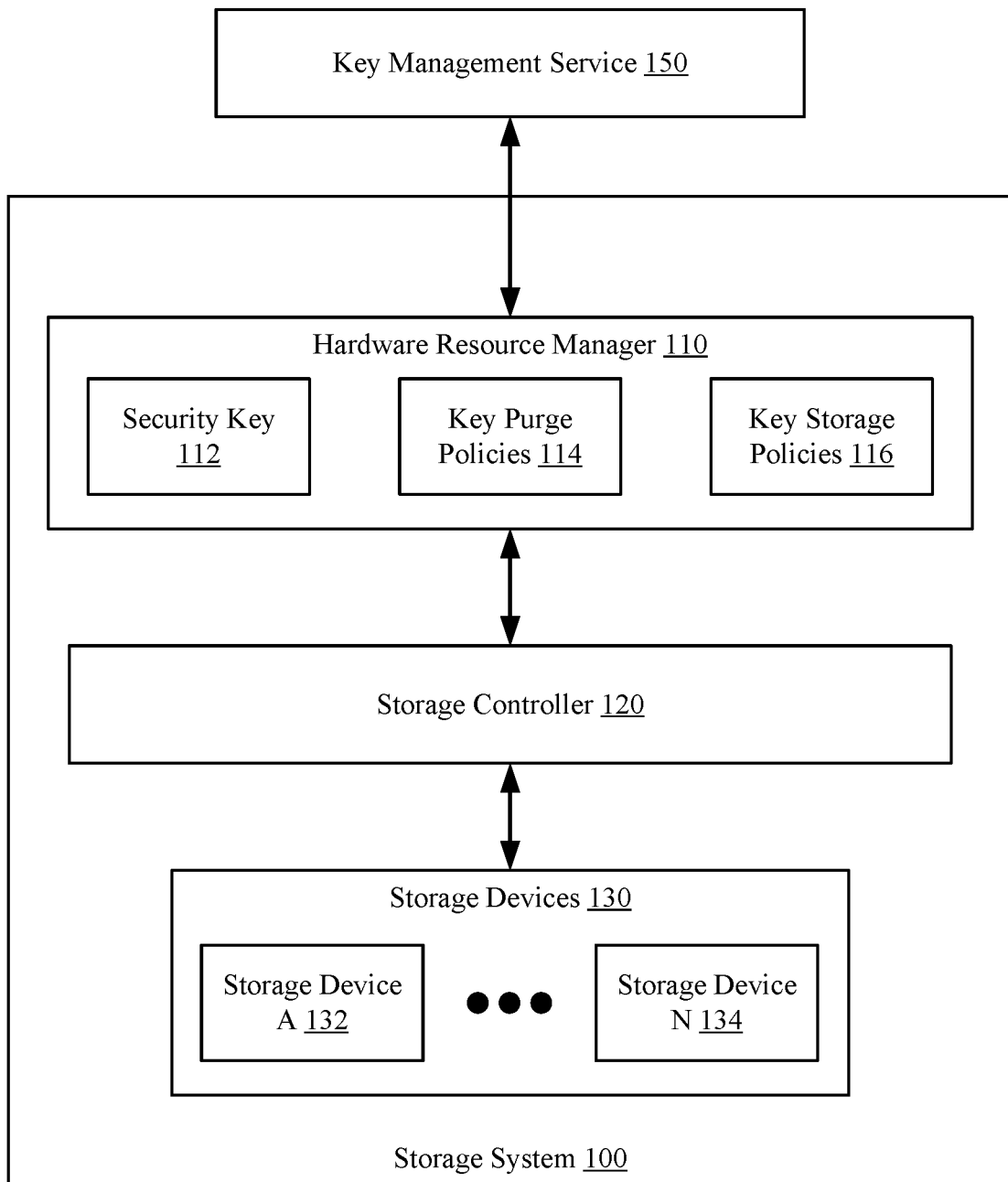
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing a storage system. Currently there are a few methods to manage drives by hardware resource manager. In one or more embodiments, the hardware resource manager stores key storage policies that specify whether a security key is to be stored. The security key may be obtained from a key management service (KMS), which may be an external entity that manages the security keys used to either secure (e.g., prevent access to) data in the storage devices of the storage system or to access (e.g., unlock) the data. The hardware resource manager may be, for example, a baseboard management controller (BMC), which in turn use the key(s) to protect the SEDs connected to it. The protection may be performed using encryption algorithms applied to the data in the SEDs. The key storage policy may specify policies for obtaining the security key and determining whether to store the security key for future use and/or when to delete the security key. The key storage policy may be determined by an administrator of the storage system.

Embodiments of the invention include a method for initiating a boot-up of the hardware resource manager to determine whether communication with the KMS is intact. The hardware resource manager may further utilize key purge policies to determine a period of time, after a lost connection to the KMS, for storing the security key before deleting it (or purging it). The key purge policies may specify the time period as a combination of a synchronized real-time timer and a count-down timer. The synchronized real-time timer may utilize a point in time (e.g., a date and time) to determine when to purge the security key. Further, a count-down timer may initiate a specified period of time that counts down in response to detecting the lost connection.

The key purge policies may further specify obtaining KMS information to determine whether the security key is to be removed. For example, the KMS information may be included in a header of a message that includes the security key. Information specified in the header may be processed to determine whether, for example, the link layer discover protocol (LLDP) header information is different from what is expected in the key purge policies. If any unexpected changes are found in the LLDP header information, the hardware resource manager initiates a purging of the security key.

FIG. 1 shows an example system in accordance with one or more embodiments of the invention. The system includes a key management service (150) and a storage system (100) that includes one or more storage devices (130), a storage controller (120) that manages the storage devices (130), and a hardware resource manager (110). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the storage controller (120) manages the operation of the storage devices (130). Specifically, the storage controller (120) manages the access to data that may be secured in the storage devices (132, 134) by initiating unlocking operations and/or security operations on the storage devices (130). The storage controller (120) may utilize resources of the hardware resource manager (110) to implement any portion of the management of the storage devices (130).

While the system of FIG. 1 is illustrated as only including one storage system (130), the storage controller (120) may manage the operation of any number of storage systems without departing from the invention.

Figure 4:
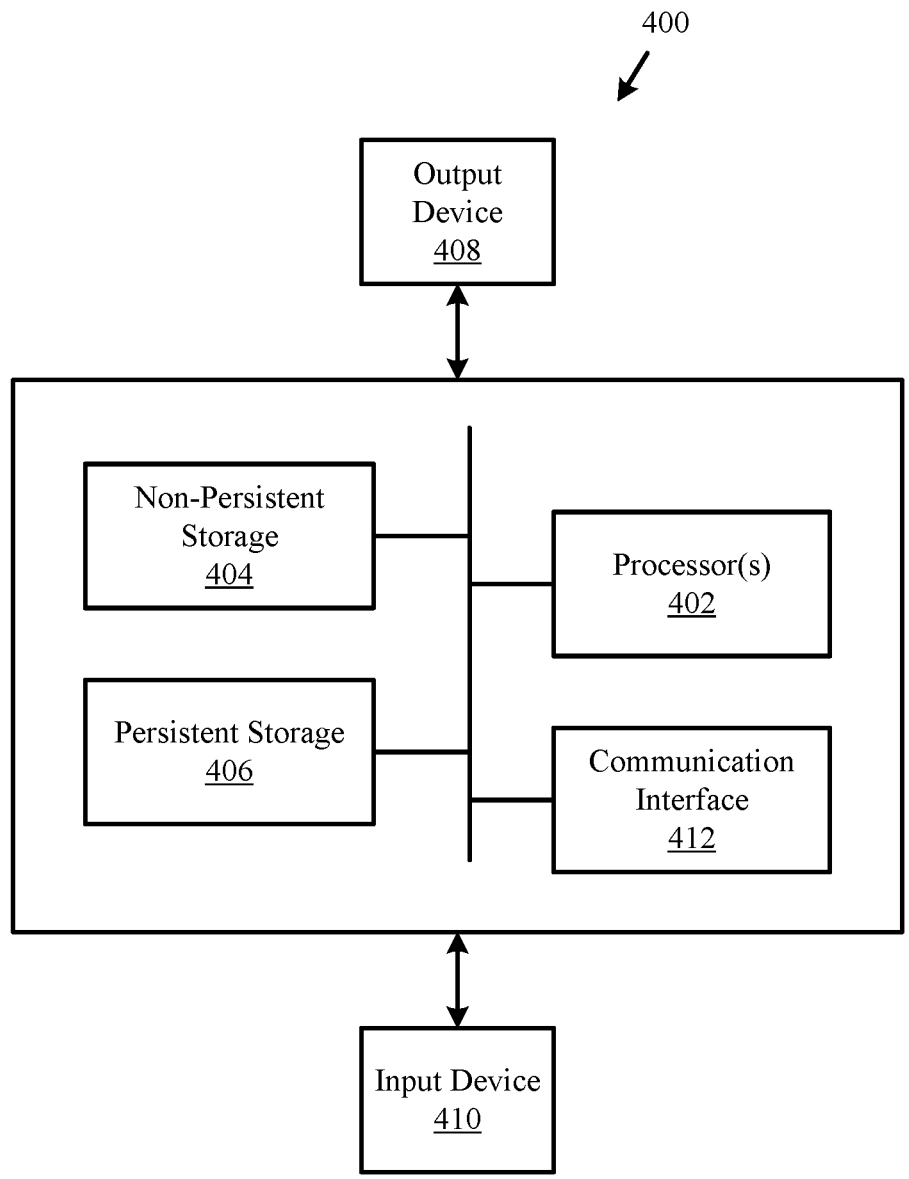
FIG. 4 shows a diagram of a computing device in accordance with one or more embodiments of the invention.

In one or more embodiments of the invention, the storage controller (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the storage controller (140) described throughout this application and/or all, or a portion thereof, of the methods illustrated in FIGS. 2A-2C, described below.

In one or more embodiments of the invention, the storage controller (120) is implemented as a logical device. The logical device may utilize the hardware computing resources of any number of computing devices, and thereby provide the functionality of the storage controller (120) described throughout this application and/or all, or a portion thereof, of the methods illustrated in FIGS. 2A-2C.

In one or more embodiments of the invention, the hardware resource manager (110) manages the resources used by the storage systems. Some of the resources managed by the hardware resource manager (110) may not be illustrated in FIG. 1. For example, the hardware resource manager (110) may manage the power supplied to the storage controller (120) and/or the storage devices (130). As another example, the hardware resource manager (110) may manage the fan speed of fans designed to cool the computing resources of the storage system (100).

In one or more embodiments of the invention, the hardware resource manager (110) includes functionality for providing security management services. The security management services may include performing security operations initiated by the storage controller (120). The security operations may include, for example, unlocking a secured storage device or otherwise including the storage device using a hot insertion of the storage device. As a second example, the security operations may include securing an unsecured storage device.

In one or more embodiments of the invention, the security key (112) is a data structure used to either secure the data in the storage devices (130) or unlock the data. The security key (112) may be stored in persistent storage (e.g., a solid-state drive, non-volatile memory devices, etc.). The persistent storage may be, for example, a credential vault. The credential vault may require input of information to be provided in order for the data (e.g., the security) stored in the credential vault to be accessed. The information may be credential information relating to an administrator of the storage system (100). Other entities may be associated with the credential information without departing from the invention.

In one or more embodiments of the invention, the key purge policies (114) are data structures that specify conditions for deleting the security key (112) from being stored locally (also referred to as being stored in the hardware resource manager (110). As a first example, a condition of the key purge policies (114) includes initiating a failure timer that begins a count down when an attempt to connect with the key management service (150) fails. When the failure timer reaches an end, the condition may be to delete the security key (112) from the hardware resource manager (110). As a second example, a condition of the key purge policies (114) may specify that when the LLDP header information varies from an expected value or set of values, the hardware resource manager (110) is to delete the security key (112).

In one or more embodiments of the invention, the key storage policies (116) are data structures that specify conditions for storing the security key (112) obtained from the key management service (150). These conditions may be predetermined by the administrator. For example, the key storage policies (116) may specify storing the security key (112) any time the hardware resource manager (110) boots up. Alternatively, the key storage policies (116) may specify sending a message to the administrator (not shown) asking whether to store the security key (112) after each boot up. The hardware resource manager (110) may store the security key (112) (or not store the security key (112)) based on the response.

In one or more embodiments of the invention, the hardware resource manager (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the hardware resource manager (110) described throughout this application and/or all, or a portion thereof, of the methods described in FIGS. 2A-2C.

In one or more embodiments of the invention, hardware resource manager (110) is implemented as a baseboard management controller (BMC). The BMC may include the computing components required to provide the BMC the capability for performing the functionality of the hardware resource manager (110) described throughout the application and/or all, or a portion thereof, of the methods described in FIGS. 2A and 2D.

In one or more embodiments of the invention, the storage system (100) stores data. The data may be generated by and/or stored from the storage devices (130). The storage system (100) may utilize the storage devices (130) to store the data. Any number of storage devices (130) may be used to store the data. The storage devices (130) may be configured in any manner for utilization of storage. For example, the storage devices (130) may be in a secured state. As used herein, a secured state refers to a state of the storage devices (130) in which the storage devices implement security policies on the data using the storage device keys.

In one or more embodiments of the invention, the storage system (130) provides services to users, e.g., clients (not shown). For example, the services may include the use of the storage system (150) to store data, read stored data, and/or otherwise access the storage system (150). Further, the storage system (100) may include services for securing the data stored in the storage devices (130). The management of the security states may be initiated by the storage controller (120) of the storage system (100). The storage controller (120) may offload any portion of the management to the hardware resource manager (110). For example, during an initial boot-up, the storage controller (120) may perform initial discovery on the storage devices (130) to identify the current security states of the storage devices (132, 134). Based on the security mode of the storage controller (120), the storage controller may remediate the security states of the storage devices (130) to maintain consistency and security requirements.

In one or more embodiments of the invention, the storage controller (120) may operate in a secure mode (also referred to as a secured mode). In one or more embodiments of the invention, the secure mode refers to a mode of operation in which the storage controller (120) ensures the storage devices (130) are all secured (e.g., in a secured state). The storage controller (120) may ensure such state by communicating with the hardware resource manager (110) to specify whether it needs aid to place any unsecured storage devices to a secured state.

In one or more embodiments of the invention, the hardware resource manager (110) aids in the management of the security states of the storage devices (130) by managing the generation and/or storage of storage device keys. In one or more embodiments of the invention, the storage device keys are data structures that may be used to manage the security for the access to the data in the storage devices (130). The storage device keys may be used to prevent undesired access to the data in the storage devices (130). One storage device key may be used for all storage devices (132, 134) in the storage system (100). Alternatively, each storage device (132, 134) may correspond to a unique storage device key.

In one or more embodiments of the invention, the storage devices (130) may include functionality for performing self-encryption. Specifically, the storage devices (130) may utilize the storage device keys to encrypt their respective data. As such, the storage devices (130) may be referred to as, for example, self-encrypting devices (SEDs).

In one or more embodiments of the invention, the storage devices (130) may implement virtual disks. In one or more embodiments of the invention, a virtual disk refers to a logical storage device that may include any virtual addresses that may be used to access the data stored in the respective physical addresses on the storage devices (130). In one or more embodiments of the invention, the virtual disks may store a copy of the data (e.g., encrypted or unencrypted) stored in the storage devices (130). In this manner, the access to the data in the storage devices (130) may require the use of the virtual disks. Further, the removal (e.g., a deletion) of a virtual disk may result in a loss of access to the data managed by the removed virtual disk. Such actions (e.g., the deletion or otherwise removal of the virtual disk) may be initiated strategically by the hardware resource manager (110) in response to an unsecured mode of the storage controller (120).

As used herein, the unsecured mode (also referred to as the unsecure mode) of the storage controller refers to a mode of operation of the storage controller (120) in which the storage of data is not secured by the storage controller. Specifically, in the unsecured mode, the storage controller (120) is not programmed to ensure the data in the storage devices (130) are encrypted. Such mode may compromise the integrity of the data in the storage devices (130) managed by the storage controller (110). As such, the hardware resource manager (110) may perform security state revert processes (discussed in FIG. 2A) to protect the integrity of the data of the storage devices.

In one or more embodiments of the invention, the storage system (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the storage system (100) described throughout this application.

In one or more embodiments of the invention, the storage system (100) is implemented as a logical device. The logical device may utilize the hardware computing resources of any number of computing devices and thereby provide the functionality of the storage system (130) described throughout this application.

While FIG. 1 shows a configuration of components, other configurations may be used without departing from the scope of embodiments described herein. Accordingly, embodiments disclosed herein should not be limited to the configuration of components shown in FIG. 1.

Figure 2A:
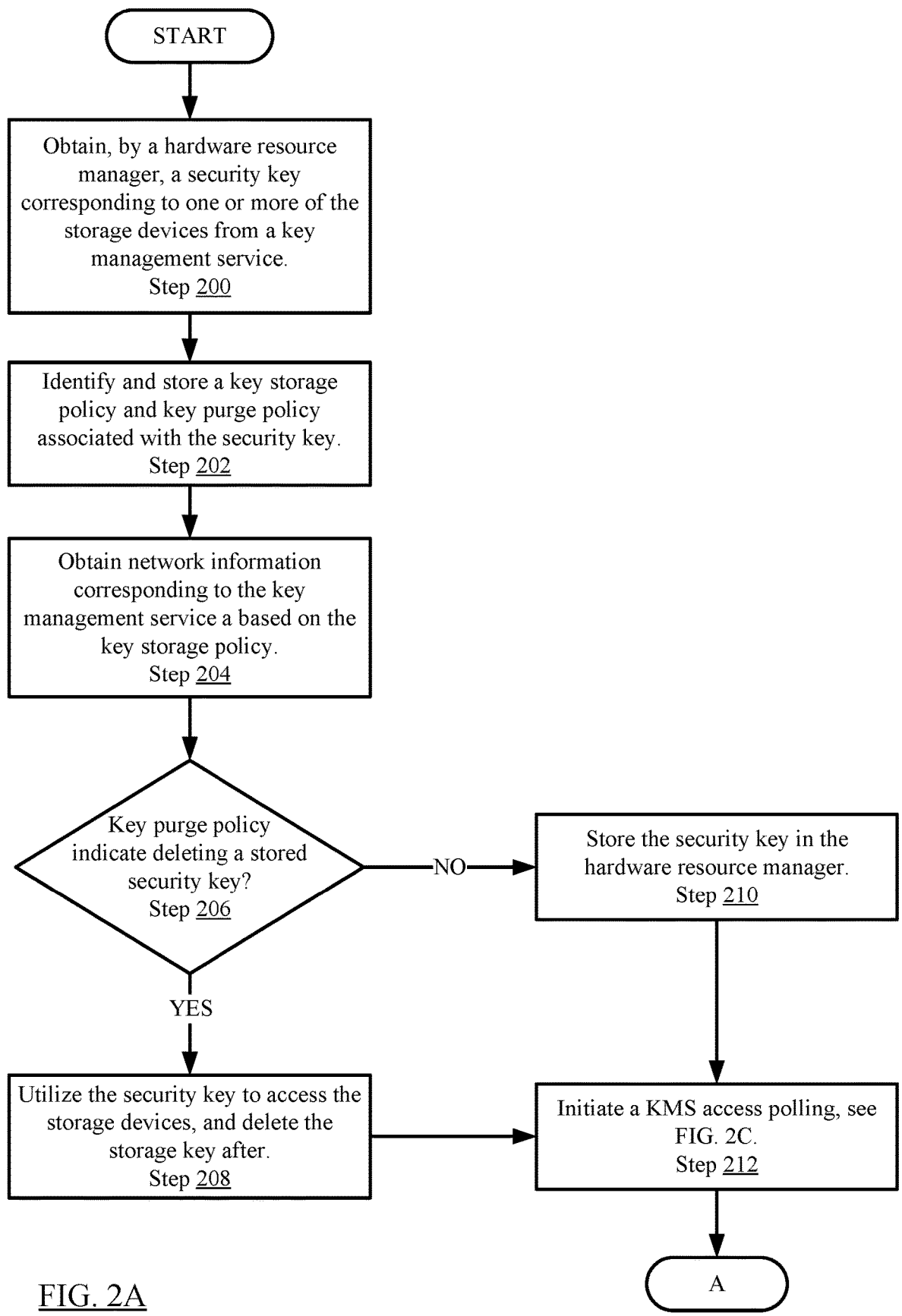
FIG. 2A shows a flowchart of a method for processing an obtained security key in accordance with one or more embodiments of the invention.
Figure 2B:
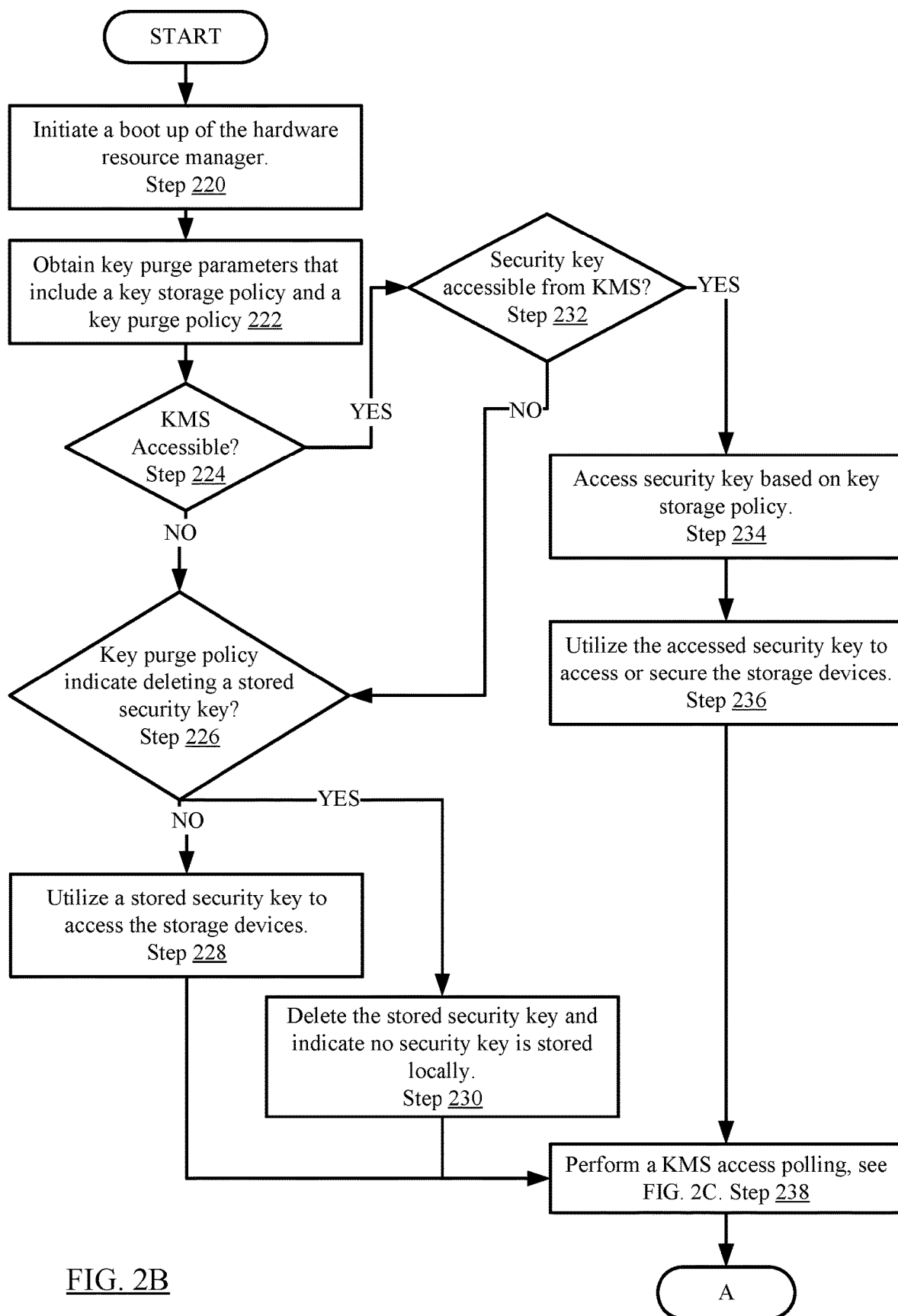
FIG. 2B shows a flowchart of a method for initializing boot-up of a hardware resource manager in accordance with one or more embodiments of the invention.
Figure 2C:
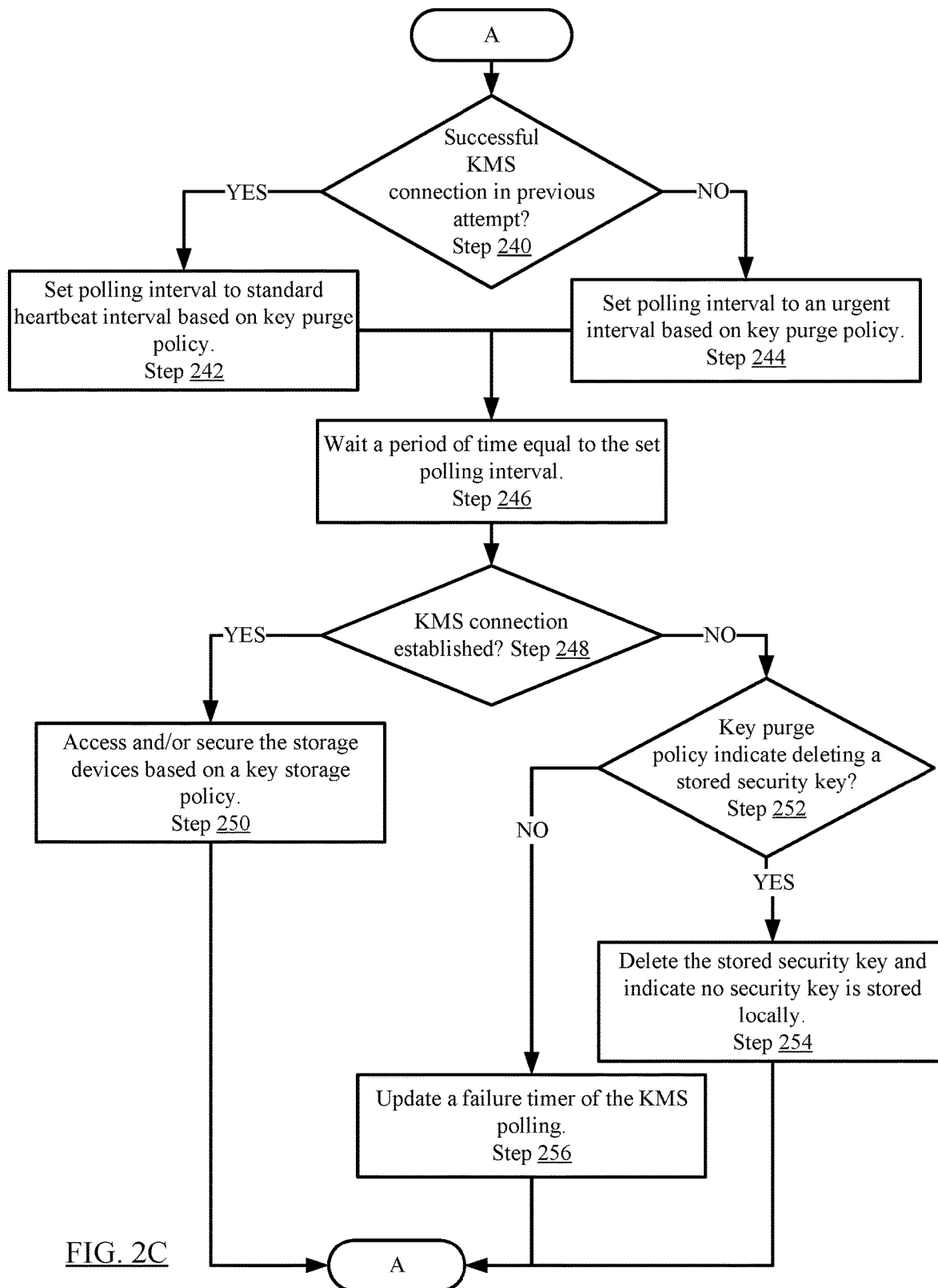
FIG. 2C shows a flowchart of a method for initiating the key management service access polling in accordance with one or more embodiments of the invention.

FIGS. 2A-2C show flowcharts in accordance with one or more embodiments of the invention. FIG. 2A shows a flowchart that focuses on an initial connectivity between the hardware resource manager and the key management service (KMS) and an initial storage of the security key. FIG. 2B focuses on attempting connectivity to the KMS after the initial connectivity has been established. FIG. 2C focuses on the monitoring of the KMS connection following either FIG. 2A or FIG. 2C. The discussion of FIGS. 2A-2C is discussed below.

FIG. 2A shows a flowchart of a method for processing an obtained security key in accordance with one or more embodiments of the invention. The method of FIG. 2A may be performed by, for example, a hardware resource manager (110, FIG. 1). Other components of the system of FIG. 1 may perform all, or a portion, of the method of FIG. 2A without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2A may be performed in parallel with any other steps shown in FIG. 2A-2C without departing from the scope of the invention.

Turning to FIG. 2A, in step 200, a security key corresponding to one or more of the security devices in the storage system is obtained from a KMS. As discussed above, the security key may be a data structure that is used to gain access to the data in one or more storage devices. Alternatively, the security key may be used to secure (e.g., prevent access to) said data.

In step 202, a key storage policy and key purge policy associated with the security key is obtained. As discussed above, the key storage policy may specify conditions for storing the security after usage of the security key. Further, the key purge policy may specify conditions for deleting the data based on connectivity issues associated with accessing the KMS.

In step 204, network information is obtained corresponding to the key management service based on the key storage policy. In one or more embodiments of the invention, the network information may include LLDP parameters. The LLDP parameters may be included in a message that was obtained in which the security key was included. The LLDP parameters may include, for example, an identifier of the port from which the security key is obtained, an identifier for the computing device corresponding to the KMS is obtained. Additional LLDP information may be obtained in accordance with one or more embodiments of the invention.

In step 206, a determination is made about whether the key purge policy indicates deleting the security key. In one or more embodiments of the invention, the key purge policies specify conditions about whether any network changes are indicated in the obtained network information. For example, the LLDP parameters may be compared to previously-stored LLDP parameters, and, if the two are different or not as expected, then a network change is detected. In this scenario, a condition of the key purge policy may specify deleting the security key. Alternatively, the condition may indicate determining whether the KMS connection is maintained before deleting. Such condition may be met in accordance with FIG. 2C, where a connection to the KMS is re-attempted. If the key purge policy indicates deleting the stored security key, the method proceeds to step 208; otherwise, the method proceeds to step 210.

In step 208, following the determination that the key purge policy indicates deleting the security key, the security key is utilized to access the storage devices, and the security key is deleted immediately after. The security key is used to access the storage devices by decrypting the data using the security key. Further, the security key may be used to lock the data (e.g., prevent any entity from accessing the data without the security key).

In step 210, following the determination that the key purge policies do not indicate deleting the security key, the security key is stored in the hardware resource manager. Further, the network information is stored to be used for future analysis (e.g., in accordance with FIG. 2C.

In step 212, the KMS access polling is initiated. In one or more embodiments of the invention, the KMS access polling is a method for monitoring the connection to the KMS and determining whether to delete a stored security key. The determination may be based on the monitoring and/or the key purge policies discussed throughout this application.

In one or more embodiments of the invention, the KMS access polling is performed in accordance with the method illustrated in FIG. 2C. The KMS access polling may be performed in accordance with any other method(s) without departing from the invention.

FIG. 2B shows a flowchart of a method for initializing boot-up of a hardware resource manager in accordance with one or more embodiments of the invention. The method of FIG. 2B may be performed by, for example, a hardware resource manager (110, FIG. 1). Other components of the system of FIG. 1 may perform all, or a portion, of the method of FIG. 2B without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2B may be performed in parallel with any other steps shown in FIG. 2A-2C without departing from the scope of the invention.

Turning to FIG. 2B, in step 220, a boot-up of the hardware resource manager is initiated. In one or more embodiments of the invention, the boot-up is initiated by an administrator of the storage system.

In step 222, key purge parameters are obtained that include a key storage policy and a key purge policy. In one or more embodiments of the invention, the key purge parameters are obtained from a storage of the hardware resource manager. Alternatively, a portion of the key purge parameters may be obtained in response to a request to an administrator to specify whether a security key is to be locally by the hardware resource manager.

As discussed above, the key purge policies may specify the failure timer to be used to determine when to purge the security key. The key purge policies may further specify whether obtained network information (e.g., LLDP parameters) indicate a network change in the KMS. The key purge polices may specify conditions to be met based on the network information and/or the failure timer to determine whether this indicates deleting the security key.

In step 224, a determination is made about whether the KMS is accessible. The determination may be made based on a connection attempt made with the KMS. If the KMS is accessible, the method proceeds to step 232; otherwise, the method proceeds to step 226.

In step 226, following the determination that the KMS is not accessible, a determination is made about whether the key purge policy indicates deleting a stored security key. In one or more embodiments of the invention, the key purge policy may specify deleting the stored security key immediately after the connection to the KMS is lost. Alternatively, the key purge policies may specify that a failure timer is to be initiated based on the failure to communicate with the KMS. If the key purge policy indicates deleting the stored security key, the method proceeds to step 230; otherwise, the method proceeds to step 228.

In step 228, following the determination that the key purge policies do not indicate deleting a stored security key, the stored security key is used to access the storage devices. The stored security key is used to access the storage devices by authenticating the data with the storage devices using the security key.

In step 230, following the determination that the key purge policy indicates deleting the stored security key, the hardware resource manager deletes the stored security key.

In step 232, following the determination that the KMS is accessible, a determination is made about whether the security key is accessible from the KMS. Specifically, the determination relates to whether the security key is to be accessed from the KMS or from the hardware resource manager. The determination may be based on whether the security key is stored in the hardware resource manager (e.g., in accordance with the key storage policy) and/or whether the hardware resource manager is to access the security key from the KMS. If the security key is accessible from the KMS, the method proceeds to step 234; otherwise, the method proceeds to step 226.

In step 234, following the determination that the security key is accessible from the KMS, the security key is accessed. Further, based on the key storage policy, the key is stored locally in the hardware resource manager.

In step 236, the accessed security key is used to access or secure the storage devices. The accessed security key is used to access the storage devices by decrypting the data using the security key. Further, the security key may be used to encrypt the data (e.g., if the security key is an encryption key).

In step 238, the KMS access polling is initiated. In one or more embodiments of the invention, the KMS access polling is a method for monitoring the connection to the KMS and determining whether to delete a stored security key. The determination may be based on the monitoring and/or the key purge policies discussed throughout this application.

In one or more embodiments of the invention, the KMS access polling is performed in accordance with the method illustrated in FIG. 2C. The KMS access polling may be performed in accordance with any other method(s) without departing from the invention.

FIG. 2C shows a flowchart of a method for initiating the key management service access polling in accordance with one or more embodiments of the invention. The method of FIG. 2C may be performed by, for example, a hardware resource manager (110, FIG. 1). Other components of the system of FIG. 1 may perform all, or a portion, of the method of FIG. 2C without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2C may be performed in parallel with any other steps shown in FIG. 2A-2C without departing from the scope of the invention.

In step 240, a determination is made about whether a previous attempt to connect with the KMS was successful. The previous attempt may be an attempt as discussed in the method of FIG. 2C. Alternatively, the previous attempt may be the attempt discussed in step 248. If the previous attempt was successful, the method proceeds to step 242; otherwise, the method proceeds to step 244.

In step 242, following the determination that the previous attempt to connect to the KMS was successful, the polling interval is set to a standard heartbeat interval. In one or more embodiments of the invention, the standard heartbeat interval is a value corresponding to a period of time to wait before initiating a next attempt to establish a connection to the KMS. The value of the standard heartbeat interval may be specified in the key purge policy.

In step 244, following the determination that the previous attempt to connect to the KMS was not successful, the polling interval is set to an urgent interval. In one or more embodiments of the invention, the urgent interval is a value corresponding to a period of time to wait before initiating a next attempt to establish a connection to the KMS. The value of the urgent interval may be specified in the key purge policy. In one or more embodiments of the invention, the period of time corresponding to the urgent interval is significantly shorter than the period of time corresponding to the standard heartbeat interval. For example, the standard heartbeat interval may correspond to a period of time of four hours, and the urgent interval may correspond to a period of time of ten minutes. Other periods of time may correspond to the urgent interval or the standard heartbeat interval without departing from the invention.

In step 246, the hardware resource manager waits the period of time corresponding to the set polling interval. The set polling interval may be the standard heartbeat interval or the urgent interval as discussed above in steps 242 and/or 244.

In step 248, a determination is made about whether a connection to the KMS is established. If the KMS connection is established, the method proceeds to step 250; otherwise, the method proceeds to step 252.

In step 250, following the determination that a connection to the KMS is established, a security key is used to access the storage devices. The security key is used to access the storage devices by decrypting the data using the security key. Further, the security key may be used to encrypt the data (e.g., if the security key is an encryption key).

In one or more embodiments of the invention, the security key is stored in accordance with the key storage policy as discussed throughout this application. Alternatively, the security key is one accessed from the KMS.

In step 252, following the determination that a connection to the KMS is not established, a determination is made about whether a key purge policy indicates deleting a stored security key. The determination may be based on the current value of the failure timer. If the failure timer has counted down all the way, a condition of the key purge policy may be met that indicates deleting the security key. Alternatively, the condition may be based on a synchronized real-time timer. If an internal clock of the hardware resource manager indicates a point in time that is after the specified synchronized real-time timer, the condition of the key purge policy may indicate that the security key is to be deleted. If the key purge policy indicates deleting the stored security key, the method proceeds to step 256; otherwise, the method proceeds to step 254.

In step 254, following the determination that the key purge policy indicates deleting the stored security key, the hardware resource manager deletes the stored security key.

In step 256, following the determination that the key purge policy does not indicate deleting a stored security key, the failure timer of the KMS polling is updated. In one or more embodiments of the invention, the failure timer is updated based on the elapsed time after the initial attempt to connect to the KMS is lost. The failure timer may, for example, be a count down.

EXAMPLE

Figure 3A:
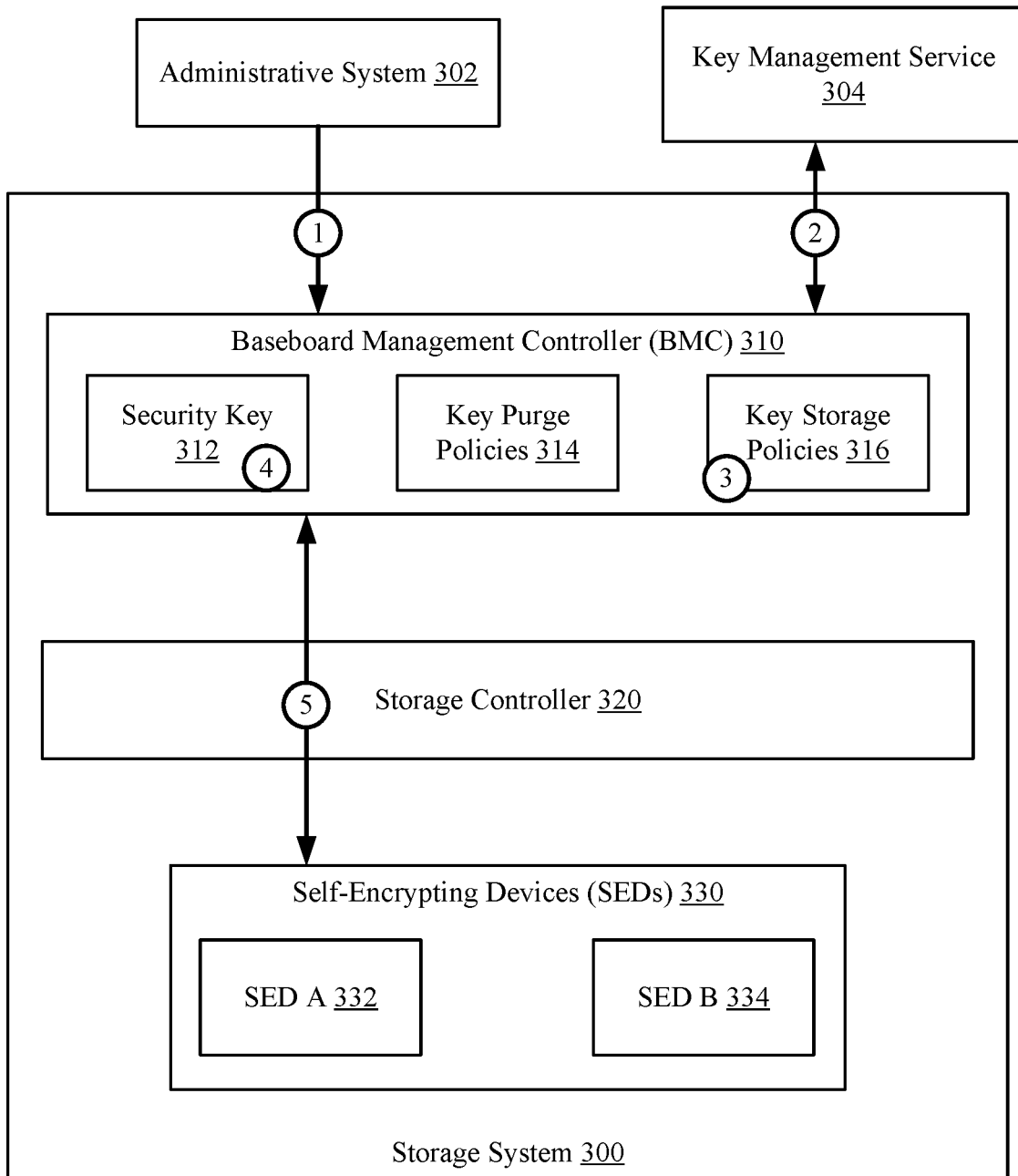
FIGS. 3A-3B shows an example in accordance with one or more embodiments of the invention.
Figure 3B:
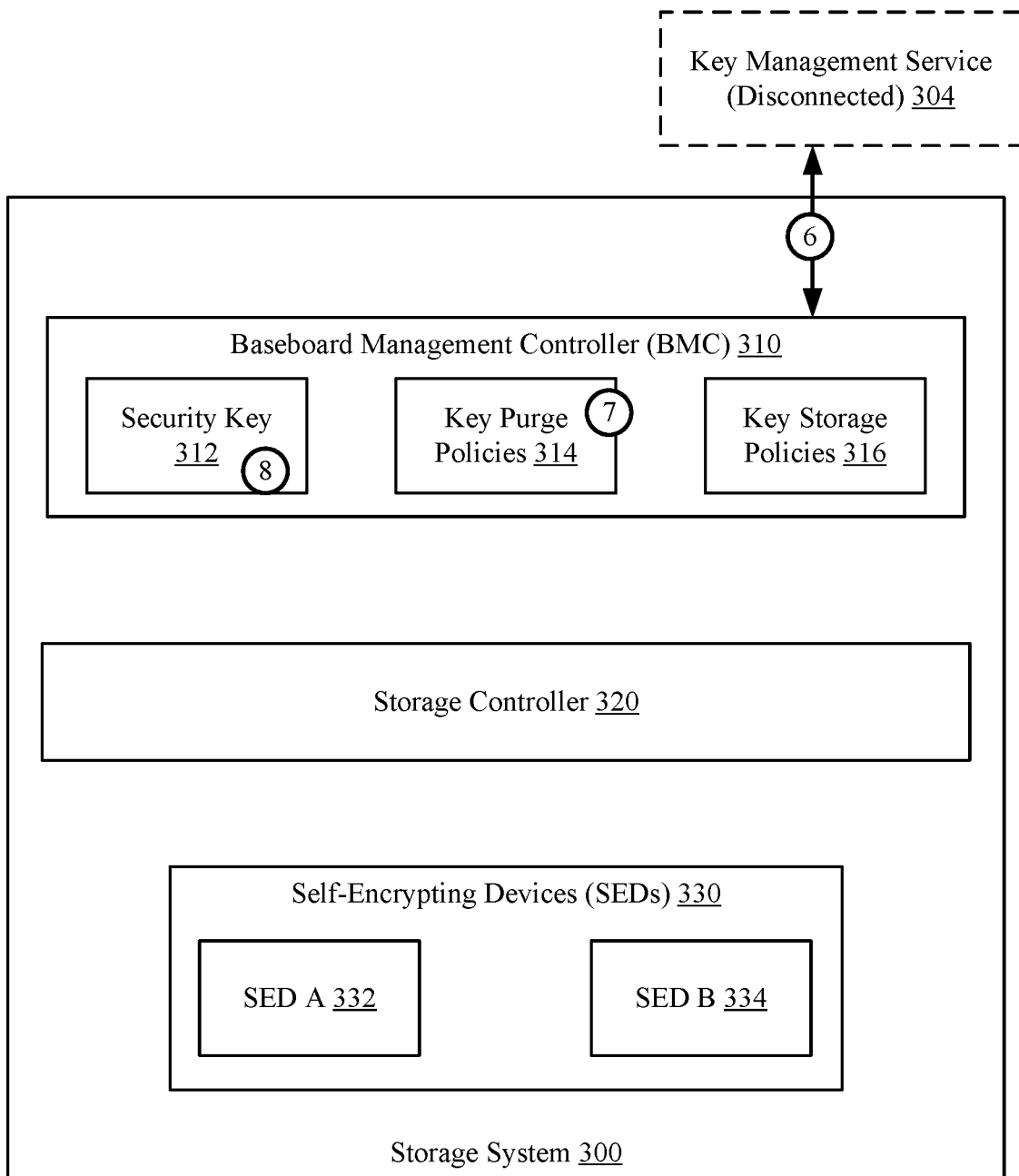

The following section describes an example. The example, illustrated in FIGS. 3A-3B is not intended to limit the invention. Turning to the example, consider a scenario in which a storage system is utilized to store data. FIG. 3A shows an example system including an administrative system (302), a key management service (304), and a storage system (300). The storage system (300) includes a baseboard management controller (BMC) (310), a storage controller (320), and two self-encrypting devices (SEDs) (330). The SEDs (330) include SED A (332) and SED B (334). For the sake of brevity, not all components of the example system may be illustrated in FIG. 3A.

The administrative system (302) sends a message to the BMC (310) that specifies the key storage policies (316) to be implemented [1]. The storage system (330), in response to the message, initiates a boot-up of the BMC (310) [2].

The BMC (310) initiates the boot-up in accordance with FIG. 2B. Specifically, the BMC (310) initiates communication with a KMS (304) [2]. The connection includes obtaining a security key and network information. The security key may be used to encrypt both SED A (332) and SED B (334). The BMC (310), in response to obtaining connection, consults with key storage policies (316) to determine whether the security is to be stored after usage [3]. The key storage policies (316), obtained from the administrative system (302), specifies storing the security key. Based on the key storage policies (316), stores the security key (312) [4]. Following the storage, the BMC (310) utilizes the security key (312) to lock the data of the SEDs (330).

FIG. 3B shows an example system at a later point in time. For the sake of brevity, not all components of the example system may be shown in FIG. 3B. Turning to FIG. 3B, at the later point in time, a connection to the KMS (304) is detected [6]. In response to this detection, the BMC (310) analyzes the key purge policies (314) to determine whether the security key is to be deleted. The key purge policies (314) specify a condition that specifies waiting a period of time of four hours until a connection is established. In response, the BMC (310) performs a periodic attempt to access the KMS (304). The periodic attempt may be performed at an urgent interval of ten minutes. After each urgent interval, a failure timer is updated that counts down from the four hour time. Once the failure timer expires (e.g., the failure timer reaches the four hours) and the KMS connection is not re-established, the BMC (310) deletes the security key (312).

END OF EXAMPLE

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of computing components in a storage system by offloading the security operations from a hardware resource manager, which may have limited resources to provide the security operations, to a KMS. The hardware resource manager may provide methods of utilizing an external entity (e.g., a key management service) to generate and manage the storage of the keys.

Embodiments of the invention provide the benefit of having a local security key stored in the storage system used to access and/or secure the data of the storage devices while also implementing policies to prevent potential scenarios in which a malicious entity accesses the storage system and attempts to access the data of the storage devices without authorized access. In such scenarios in which the storage system is accessed and the connection to the KMS is lost, the storage system may implement the policies which includes deleting the security key, thus preventing access to the data. Further, embodiments of the invention may include monitoring the network information, and determining whether the changes in the network information indicate deleting the stored security key.

Thus, embodiments of the invention may address the problem of inefficient use of computing resources in a distributed computing environment. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a storage system, the method comprising:
   in response to a boot up of a hardware resource manager, obtaining a key purge policy associated with a security key from storage of the hardware resource manager, wherein the hardware resource manager is a baseboard management controller (BMC),
      wherein the key purge policy comprises a condition for deleting the security key, and
      wherein the condition is based on whether a network change when accessing a key management service (KMS) is detected;
   in response to the boot up, initiating access to the KMS;
   obtaining, based on the access, a message from the KMS, wherein the message includes the security key and network information,
      wherein the network information comprises link layer discover protocol (LLDP) parameters, wherein the LLDP parameters comprises: an identifier of a port from which the security key is obtained and an identifier of a computing device corresponding to the KMS;
in response to obtaining the message:
using the security key to access a secured storage device of the storage system;
performing a network analysis on the network information to identify a network change;
making a determination, based on the network change and the key purge policy, that the security key is to be deleted;
based on the determination, deleting the security key;
after deleting the security key:
performing a KMS access polling, wherein performing the KMS access polling comprises:
waiting a polling interval before attempting a KMS connection;
making a second determination that the KMS connection is not established; and
based on the second determination, updating a failure timer of the key purge policy.

2. The method of claim 1, wherein performing the network analysis comprises:
making a second determination that a network connection is not available;
making a third determination that the LLDP parameters are different from expected values of the key purge policy; and
based on the second and third determinations, detecting the network change.

3. The method of claim 1, wherein the KMS access polling further comprising:
waiting a second polling interval before reattempting the KMS connection;
making a third determination that the KMS connection is not established; and
based on the third determination:
making a fourth determination that the failure timer has expired; and
based on the fourth determination, deleting the security key.

4. The method of claim 1, wherein the polling interval is based on whether a previous most recent attempt to access the KMS was successful.

5. A system for managing a storage system, comprising:
a hardware processor; and
a key management service (KMS);
the storage system comprising:
a plurality of storage devices; and
a hardware resource manager and the hardware processor programmed to:
in response to a boot up of the hardware resource manager, obtaining a key purge policy associated with a security key from storage of the hardware resource manager,
wherein the key purge policy comprises a condition for deleting the security key, and
wherein the condition is based on whether a network change when accessing the KMS is detected;
in response to the boot up, initiate access to the KMS;
obtaining, based on the access, a message from the KMS, wherein the message includes the security key and network information,
wherein the network information comprises link layer discover protocol (LLDP) parameters,
wherein the LLDP parameters comprises: an identifier of a port from which the security key is obtained and an identifier of a computing device corresponding to the KMS;
in response to obtaining the message:
use the security key to access a secured storage device of the plurality of storage devices;
perform a network analysis on the network information to identify a network change;
make a determination, based on the network change and the key purge policy, that the security key is to be deleted;
based on the determination, delete the security key; and
after deleting the security key, perform a KMS access polling,
wherein performing the KMS access polling comprises:
waiting a polling interval before attempting a KMS connection;
making a second determination that the KMS connection is not established; and
based on the second determination, updating a failure timer of the key purge policy,
wherein the hardware resource manager is a baseboard management controller (BMC).

6. The system of claim 5, wherein performing the network analysis comprises:
making a second determination that a network connection is not available;
making a third determination that the LLDP parameters are different from expected values of the key purge policy; and
based on the second and third determinations, detecting the network change.

7. The system of claim 5, wherein the KMS access polling further comprising:
waiting a second polling interval before reattempting the KMS connection;
making a third determination that the KMS connection is not established; and
based on the third determination:
making a fourth determination that the failure timer has expired; and
based on the fourth determination, deleting the security key.

8. The system of claim 7, wherein the polling interval is based on whether a previous most recent attempt to access the KMS was successful.

9. A non-transitory computer readable medium comprising computer readable program code, which when executed by a computer processor enables the computer processor to perform a method, the method comprising:
in response to a boot up of a hardware resource manager of a storage system, obtaining a key purge policy associated with a security key from storage of the hardware resource manager,
wherein the hardware resource manager is a baseboard management controller (BMC),
wherein the key purge policy comprises a condition for deleting the security key, and
wherein the condition is based on whether a network change when accessing a key management service (KMS) is detected;
in response to the boot up, initiating access to the KMS;

obtaining, based on the access, a message from the KMS, wherein the message includes the security key and network information,
    wherein the network information comprises link layer discover protocol (LLDP) parameters,
    wherein the LLDP parameters comprises: an identifier of a port from which the security key is obtained and an identifier of a computing device corresponding to the KMS;
in response to obtaining the message:
    using the security key to access a secured hardware storage device of the storage system;
    performing a network analysis on the network information to identify a network change;
    making a determination, based on the network change and the key purge policy, that the security key is to be deleted;
    based on the determination, deleting the security key;
after deleting the security key:
    performing a KMS access polling, wherein performing the KMS access polling comprises:
        waiting a polling interval before attempting a KMS connection;
        making a second determination that the KMS connection is not established; and
        based on the second determination, updating a failure timer of the key purge policy.

10. The non-transitory computer readable medium of claim 9, wherein performing the network analysis comprises:
    making a second determination that a network connection is not available;
    making a third determination that the LLDP parameters are different from expected values of the key purge policy; and
    based on the second and third determinations, detecting the network change.

11. The non-transitory computer readable medium of claim 9, wherein the KMS access polling further comprising:
    waiting a second polling interval before reattempting the KMS connection;
    making a third determination that the KMS connection is not established; and
    based on the third determination:
    making a fourth determination that the failure timer has expired; and
    based on the fourth determination, deleting the security key.

12. The non-transitory computer readable medium of claim 9, wherein the polling interval is based on whether a previous most recent attempt to access the KMS was successful.

* * * * *